United States Patent
Brenner et al.

(10) Patent No.: US 8,996,834 B2
(45) Date of Patent: Mar. 31, 2015

(54) MEMORY CLASS BASED HEAP PARTITIONING

(75) Inventors: Larry Bert Brenner, Austin, TX (US); Michael Edward Lyons, Round Rock, TX (US); Bruce G. Mealey, Austin, TX (US); James Bernard Moody, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1733 days.

(21) Appl. No.: 11/751,277

(22) Filed: May 21, 2007

(65) Prior Publication Data

US 2008/0294864 A1    Nov. 27, 2008

(51) Int. Cl.
*G06F 12/00* (2006.01)
*G06F 11/07* (2006.01)
*G06F 12/02* (2006.01)

(52) U.S. Cl.
CPC .......... *G06F 11/0751* (2013.01); *G06F 12/023* (2013.01); *G06F 12/0284* (2013.01); *G06F 11/073* (2013.01)
USPC ........... 711/170; 711/173; 711/153; 711/171; 711/129; 711/E12.006

(58) Field of Classification Search
CPC  G06F 12/023; G06F 12/0284; G06F 12/0276
USPC .................................. 711/173, 153
See application file for complete search history.

(56) References Cited

U.S. PATENT DOCUMENTS

| | | | |
|---|---|---|---|
| 5,369,778 A * | 11/1994 | San Soucie et al. | 1/1 |
| 6,816,956 B1 * | 11/2004 | Benayon et al. | 711/170 |
| 2001/0029519 A1 * | 10/2001 | Hallinan et al. | 709/104 |
| 2003/0110173 A1 * | 6/2003 | Marsland | 707/10 |
| 2004/0015976 A1 * | 1/2004 | Lam | 718/104 |
| 2004/0221120 A1 * | 11/2004 | Abrashkevich et al. | 711/170 |
| 2004/0250041 A1 * | 12/2004 | Sollich | 711/170 |
| 2005/0144410 A1 * | 6/2005 | Swafford et al. | 711/170 |
| 2005/0262056 A1 | 11/2005 | Hamzy et al. | |
| 2006/0036823 A1 | 2/2006 | Mathews et al. | |
| 2006/0059323 A1 * | 3/2006 | Rao | 711/170 |

OTHER PUBLICATIONS

U.S. Appl. No. 11/619,695, filed Jan. 4, 2007, Wildstorm.

* cited by examiner

*Primary Examiner* — Matthew Bradley
*Assistant Examiner* — Arvind Talukdar
(74) *Attorney, Agent, or Firm* — Mitch Harris, LLC; Andrew M. Harris; Parashos T. Kalaitzis

(57) ABSTRACT

The illustrative embodiments provide a computer implemented method, apparatus, and computer usable program code for managing a heap. The heap is partitioned into at least one sub heap based on a relationship to at least one memory class of a plurality of memory classes. A memory allocation request comprising a memory class is received from a requester. A unique heap handle based on the memory class and associated with a specific sub heap is generated. The unique heap handle is then returned to the requester.

15 Claims, 6 Drawing Sheets

MEMORY CLASS BASED HEAP PARTITIONING

This invention was made with United States Government support under Agreement No. NBCH3039004 awarded by DARPA. The Government has certain rights in the invention.

BACKGROUND OF THE INVENTION

1. Field of the Invention

The present invention relates generally to memory management in a data processing system and specifically to a memory management scheme that is adapted to address the problem of debugging heap.

2. Description of the Related Art

Programs often wish to dynamically allocate memory from a shared dynamic memory pool. This allows programs to scale their memory usage to runtime environments. The memory pool is a dynamic pool because the amount of memory a program needs does not need to be known until runtime. Thus, memory is allocated during runtime, or "dynamically." This shared dynamic pool of memory is often referred to as "heap" or sometimes as "shared heap."

The opposite of dynamic memory is static memory. For static memory, a program may say it always uses a fixed amount of memory. That is simpler, but it does not allow the program to use additional memory.

Heap is commonly used in single threaded applications. In single threaded applications, heap memory is shared among components of the application. An application can be very large and have unrelated components that are allocating memory from a single pool. The management of the heap is done by either the applications themselves, allocating and de-allocating memory as required, or by the operating system or other data processing system programs.

The malloc( ) application program interface (API) is an example of a memory allocator. APIs are a set of routines that an application uses to request and carry out lower-level services performed by a computer's operating system. Also, APIs may be a set of calling conventions in programming that define how a service is invoked through the application.

The memory returned from malloc( ) is often shared among multiple software components. Malloc( ) is primarily a C library routine that returns number bytes and the address for those bytes to the calling routine. The malloc( ) API takes a number-of-bytes as an input parameter. This allows programs to wait until they know input parameters to request the memory they need.

The free( ) API is used to free the memory allocated by a malloc( ) call. Other languages use memory allocators that work in the same manner. For example, in the Advanced Interactive Executive (AIX) operating system, the kernel API xmalloc( ) is used to allocate memory and xmfree( ) is used to free the memory.

Bugs occur when the programs still use the memory stored in a location even though a free( ) API has occurred. Other types of bugs include using more memory than was allocated and failing to initialize memory. These bugs can cause the previous data to corrupt or overwrite the data that is supposed to be placed into the memory currently.

When heap corruption occurs in dynamically allocated memory, the results can be unpredictable and difficult to diagnose.

SUMMARY OF THE INVENTION

The illustrative embodiments provide a computer implemented method, apparatus, and computer usable program code for managing a heap. The heap is partitioned into at least one sub heap based on a relationship to at least one memory class of a plurality of memory classes. A memory allocation request comprising a memory class is received from a requester. A unique heap handle based on the memory class and associated with a specific sub heap is generated. The unique heap handle is then returned to the requester.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
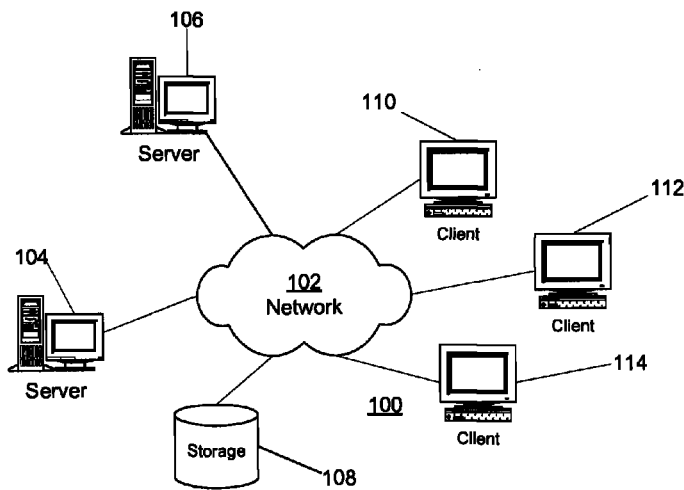
FIG. 1 depicts a pictorial representation of a network of data processing systems in which illustrative embodiments may be implemented.
Figure 2:
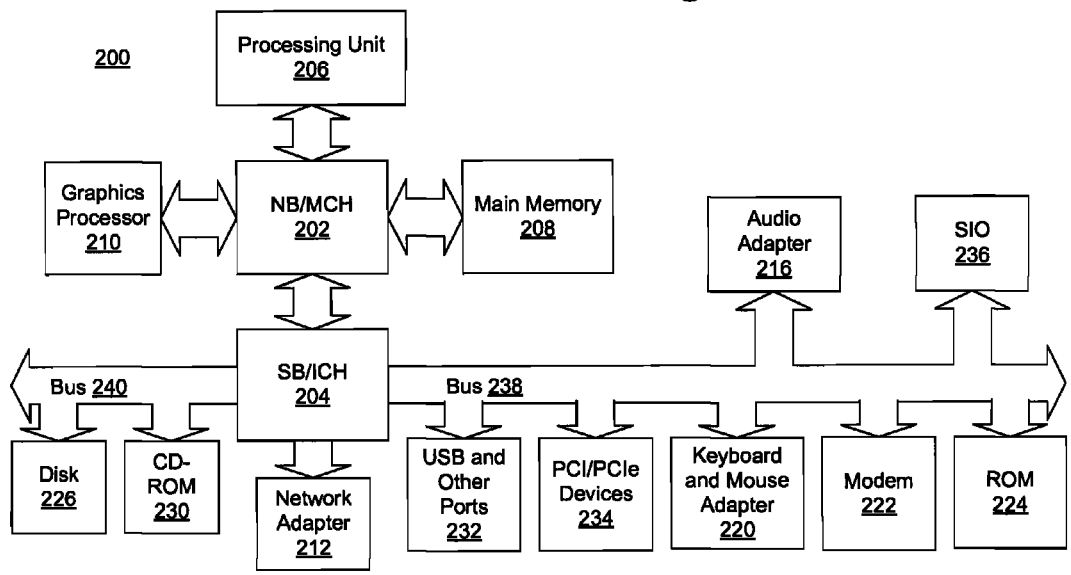
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Heap corruption issues continue to be a significant service problem. In heap management, there are two conflicting goals to be achieved. One goal is achieving optimum performance. The other goal is to provide greater protection and isolation of heap data between components in order to meet Reliability/Availability/Servicability (RAS) requirements.

Reliability requirements refer to the computer's or program's doing or performing what it is supposed to do. Availability requirements refer to the likelihood that the computer or program is ready to perform a requested task. Serviceability requirements refer to the ability figure out what went wrong and correct the error, when the system does have a problem.

Multiple heaps provide better memory isolation and can help identify the source of heap corruption. While providing multiple heaps provides better memory isolation, it has a performance cost. Providing multiple heaps adds to memory fragmentation.

The following illustrative embodiments provide for memory class based heap partitions. New APIs are provided to identify memory allocation classes that are requested from shared heaps.

The new APIs allow the system to partition what appears to be a single shared heap into multiple sub heaps based on a memory class. Partitioning a heap means that a single large pool of memory, the heap, is divided into smaller pools of memory that are isolated from each other. These, smaller, isolated pools of memory are referred to as sub heaps. The actual number of heaps or sub heaps may be varied to tradeoff performance against requirements for RAS.

Multiple sub heaps allow heap debug settings to be separately maintained for each memory class. While providing multiple memory class based sub heaps provides better memory isolation, it has a performance cost. Providing multiple sub heaps adds to memory fragmentation.

Various illustrative embodiments allow the memory classes to be easily adjusted, so that RAS/performance tradeoffs may be tuned to a specific configuration. For example, in a benchmarking environment all memory classes may be serviced from a single heap. This configuration maximizes performance at the expense of RAS.

Alternatively, when debugging a heap corruption problem, all memory classes may be provided with unique sub heaps. This configuration maximizes RAS at the expense of performance.

Typical default environments map related memory classes into the same sub heap. For example, the AIX kernel maps all memory classes that are exclusively accessed by the kernel into a new shared kernel sub heap. In contrast, memory classes belonging to the block storage sub-system are mapped to a shared block kernel extension sub heap.

Figure 3:
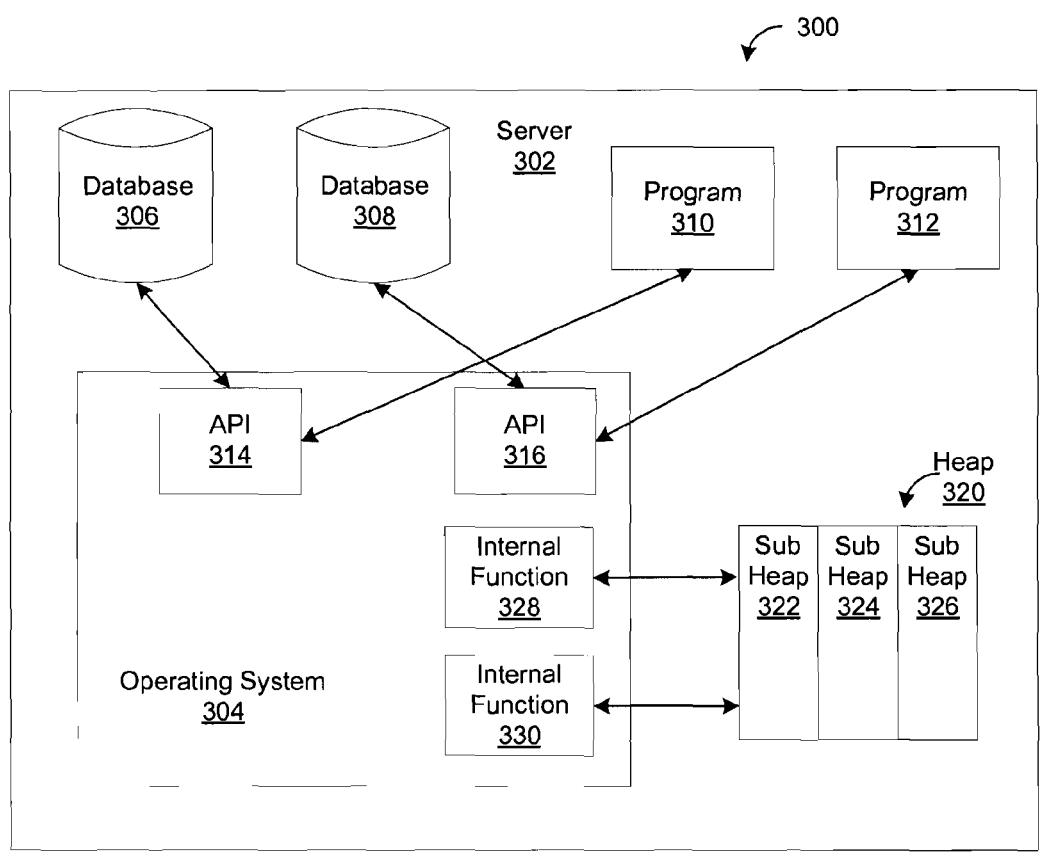
FIG. 3 is a block diagram of a system for providing multiple memory class based heaps in accordance with an illustrative embodiment.

Turning back to the figures, FIG. 3 is a block diagram of a system for providing multiple memory class based heaps in accordance with an illustrative embodiment. System 300 comprises server 302, which may be implemented as data processing system 200 in FIG. 2, that has resident operating system 304, databases 306 and 308, programs 310 and 312, APIs 314 and 316 and heap 320. While databases 306 and 308 along with programs 310 and 312 are depicted as resident on server 302 in the present illustrative embodiment, in alternative embodiments databases 306 and 308 along with programs 310 and 312 may be remote from server 302 or a combination of remote and resident.

Databases 306 and 308 and programs 310 and 312 are examples of programs that may request access to a heap. Databases 306 and 308 and programs 310 and 312 communicate with server 302 through APIs 314 and 316 requesting access to heap 320. Some typical examples of such APIs, include, but are not limited to, heap_create( ), xmalloc( ), and xmfree( ).

Internal to an operating system are functions, which is software that performs an operation. Internal functions are called to map memory classes to sub heaps. Thus, in response to a request to access heap 320 from a program, such as databases 306 and 308 and programs 310 and 312, operating system 304 calls internal functions, such as internal functions 328 and 330, to map the request to sub heaps 322, 324, or 326 of heap 320. However, it will appear to databases 306 and 308 and programs 310 and 312 that all requests are mapping to a single heap, heap 320.

It should be understood that while in the depicted illustrative embodiment databases 306 and 308, and programs 310 and 312, are shown as communicating with only one API, either API 314 or 316, databases 306 and 308, and programs 310 and 312 may communicate with any and all APIs of operating system 304.

API 314 or API 316 determine which sub heap to access by examining a heap handle, which is a unique identifier that is created by the heap_create( ) call at the time of the call's execution. This heap handle is then used for all subsequent memory allocations.

The heap handle is based on the memory class. A heap handle is a data structure that includes characteristics of a heap, or sub heap. A heap handle is used by a shared memory allocator to reference the proper sub heap. Each heap handle is unique.

Software components register for memory allocation by performing a heap_create( ) call. The heap_create( ) call is provided with heap attributes. One attribute is a memory class. This is an identifier that is registered with the system. The memory class describes the type of memory to be allocated. A memory class is assigned or determined by software or a programmer. A memory class may be named anything and can be used to categorize memory in any manner desired. For example, memory could be categorized by application, by system, by device, device driver, and so forth. The name of the memory class should be finely granulated. For example, if the calling device is a mouse device driver, the memory class may be called devicedriver_mouse, not simply devicedriver or "device." Other device drivers would be similarly named, such as devicedriver_keyboard, devicedriver_monitor, and so forth. The kernel defines memory classes for its subsystems, such as kernel_vmm (kernel virtual memory manager) or kernel_lfs (kernel logical filesystem).

The heap_create( ) call returns a heap handle that is used for subsequent memory allocations. The heap handle is a unique identifier that is based upon the received memory class. The heap_create( ) caller does not have direct knowledge of how heap_create( ) is mapping memory classes to implemented heaps. This allows a single global shared heap to be replaced with shared sub heaps. Thus, while the accessing programs all believe that one heap is being accessed, the requests may in fact be directed to specific sub heaps. For example, all request from the memory class devicedriver, such as devicedriver_keyboard, devicedriver_monitor, and devicedriver_mouse, may be sent to one shared sub heap while all requests from the kernel, such as kernel_vmm or kernel_lfs, are sent to a different sub heap.

The actual number of sub heaps used may be altered for performance and RAS requirements. For example, if the user wanted to maximize performance, then all requests may be for one heap, and no sub heap would be created. However, in the case where a problem arose and debugging was desired, the number of sub heaps could be increased. Thus, memory could be partitioned off to determine where the trouble was occurring. For example, all requests from the memory class devicedriver may be sent to one shared sub heap partition. Once it is determined that the trouble is coming from that particular sub heap, the heap may then be further partitioned into additional sub heaps.

The heap handle allows for a unique sub heap partition to be created for each member of a memory class. The heap_create( ) service maps a request to create a shared heap to the existing sub heap partition. The heap_create( ) service returns a unique heap handle that can be used for future allocation calls, such as xmalloc( ). Although the returned heap handle references a shared sub heap partition, there are properties, such as a debug level, that are unique to the returned heap handle.

Debug level controls are a collection of runtime check operations that can be performed by the allocate and free services. The debug operations can have a significant performance penalty, but they are often useful to catch memory allocation errors. For example, when full pages of memory are freed, the operating system can make them inaccessible. If a program attempts to access memory after the memory has been freed and debug code has made the memory inaccessible, a storage access exception occurs that can be easily debugged. Debug code is code used to catch or "debug" problems.

Another example of debug code is when the caller uses more memory than was allocated to the caller. The contents of memory beyond the allocated range of memory can be checked at free time to determine if the caller overran their allocated memory size. Another debug method is to place random patterns into memory at allocation time to catch callers that use memory without initializing the memory.

Prior debugging solutions called for these checks to be applied to an entire heap. In contradistinction, illustrative embodiments provide for creating debugging properties for specific memory classes. This reduces the overall performance costs by allowing higher granularity when applying debug checks. These debug properties can be set on the individual heap handle, further improving serviceability.

Furthermore, the combination of heap handles and memory classes allows a user to change both the relationship of how heap or sub heap partitions are mapped to memory classes and the debug property of the memory class without having to change the actual call routines. The user may tune the system through use of a heap configuration command, or set of commands. The user would simply alter the allocation policies and save the changes in persistent memory. Persistent memory, also referred to as persistent storage, is a memory location that survives operating system boots. Some examples of persistent memory include, but are not limited to, hard drives, floppy disks, CDs, DVDs, and so forth. Then, upon the next boot up of the system, the system would query persistent memory for the currently saved allocation policies and build the appropriate sub heap partitions.

Thus, if a user wanted to debug all devicedriver memory allocations, a user, such as a system administrator, could set the debug level associated with all handles of that memory class to the appropriate debug level. Additionally, the user may define special sub heap mappings for that memory class or classes. For example, the user could set the sub heap mapping such that allocation requests are referred to a unique sub heap partition for each member of the memory class and the debug operations are performed based on the debug properties. Alternately, the user could set the sub heap mappings such that allocation requests are referred to a unique sub heap partition only for a certain memory class while the other memory classes are referenced to a different, shared sub heap partition.

Figure 4:
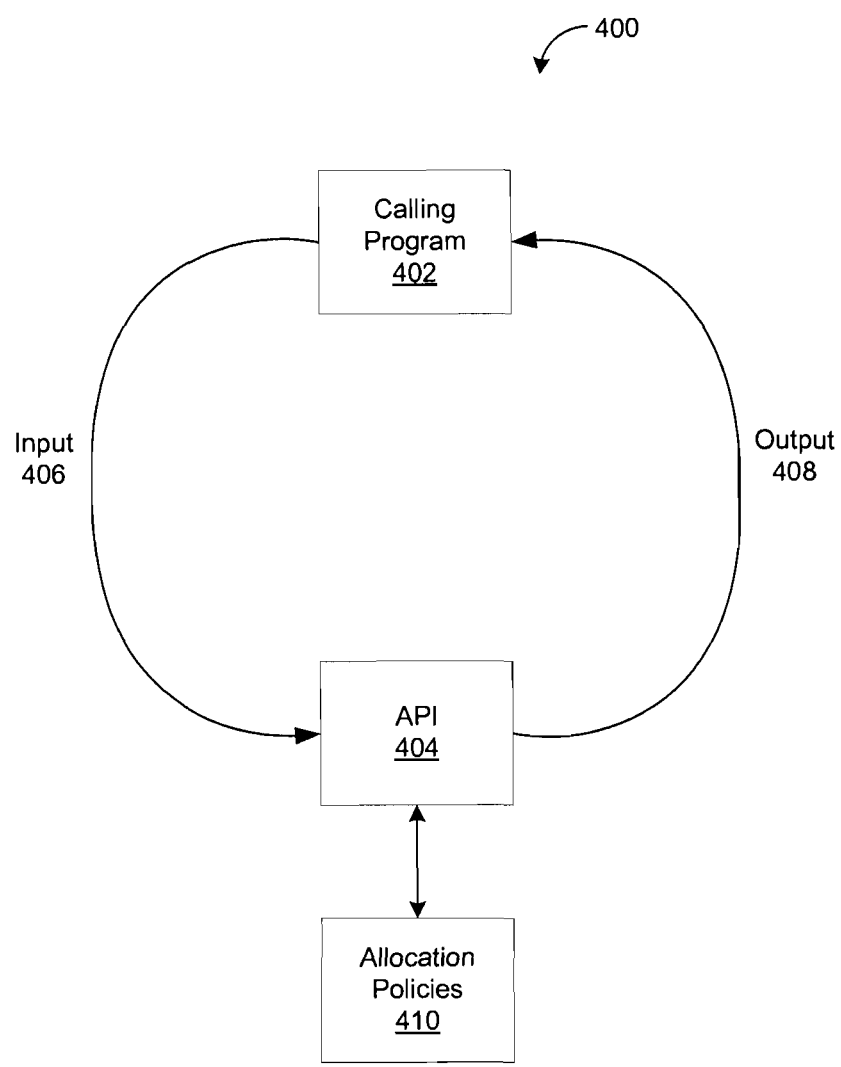
FIG. 4 is a block diagram of a system for providing a heap handle in accordance with an illustrative embodiment.

FIG. 4 is a block diagram of a system for providing a heap handle in accordance with an illustrative embodiment. System 400 comprises of calling program 402, which may be implemented as a program such as program 310 in FIG. 3, API 404, which may be implemented as API 314 in FIG. 3, and allocation policies 410. System 400 may be implemented as part of server 302 in FIG. 3

Calling program 402 sends input 406 to API 404. API 404 queries allocation policies 410 and sends output 408 to calling program 402, in response to receiving input 406. Input 406 comprises a heap_create( ) call with a memory class heap attribute. Output 408 comprises a unique heap handle.

Calling program 402 registers for memory allocation by issuing a heap_create( ) call containing a memory class heap attribute to API 404. API queries allocation policies 410 to determine an appropriate unique heap handle, based on the received memory class attribute. This unique heap handle is returned to the calling program and is used for all subsequent allocation calls.

Figure 5:
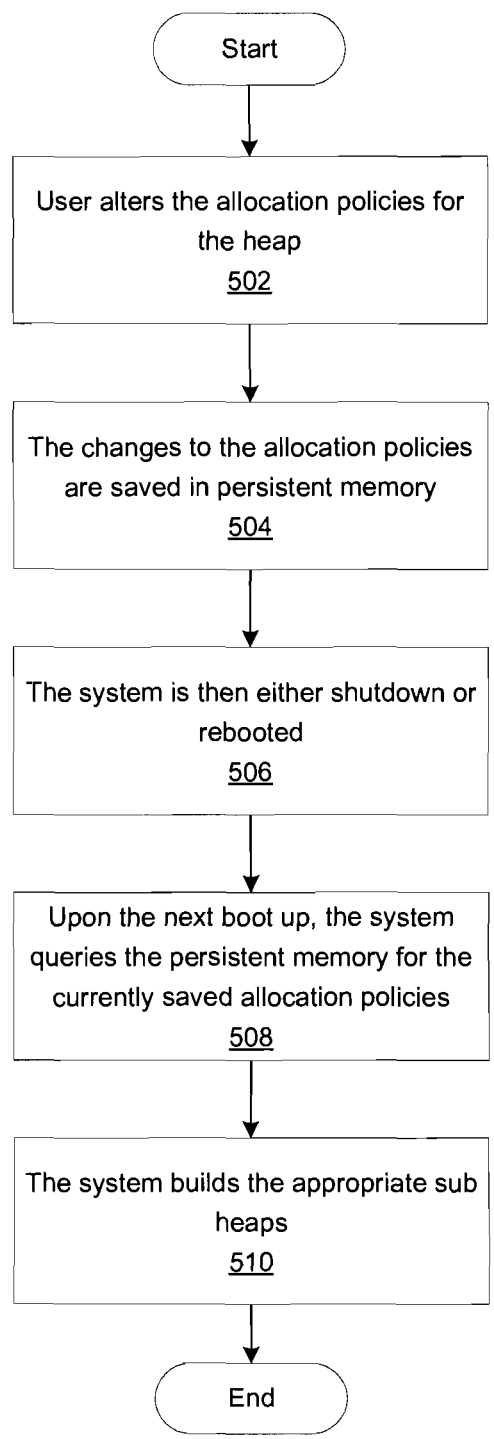
FIG. 5 is a flowchart illustrating a process for altering allocation policies in accordance with an illustrative embodiment.

FIG. 5 is a flowchart illustrating a process for altering allocation policies in accordance with an illustrative embodiment. The process of FIG. 5 may be implemented by system 300 in FIG. 3, specifically, by operating system 304. The process begins by the user altering the allocation policies, which may be implemented as allocation policies 410 in FIG. 4, for the heap (step 502). The user may alter the allocation policies manually through use of a heap configuration command, or a set of commands, or a software program may perform the alterations automatically.

The changes to the allocation policies are saved in persistent memory (step 504). The system is then either shutdown or rebooted (step 506). Upon the next boot up, the system queries the persistent memory for the currently saved allocation policies (step 508) and builds the appropriate sub heaps, which may be implemented as sub heaps 322, 324, or 326 in FIG. 3, (step 510) and the process ends.

Allocation policies include debug properties for memory classes as well as memory class mappings to heaps and sub heaps. These debug properties will be placed into heap handles by heap_create( ). Thus, as shown in FIG. 5, a user can alter both the memory class to sub heap mappings and the debug property without actually changing any code for any call routines. Thus, saving both time and expense.

Figure 6:
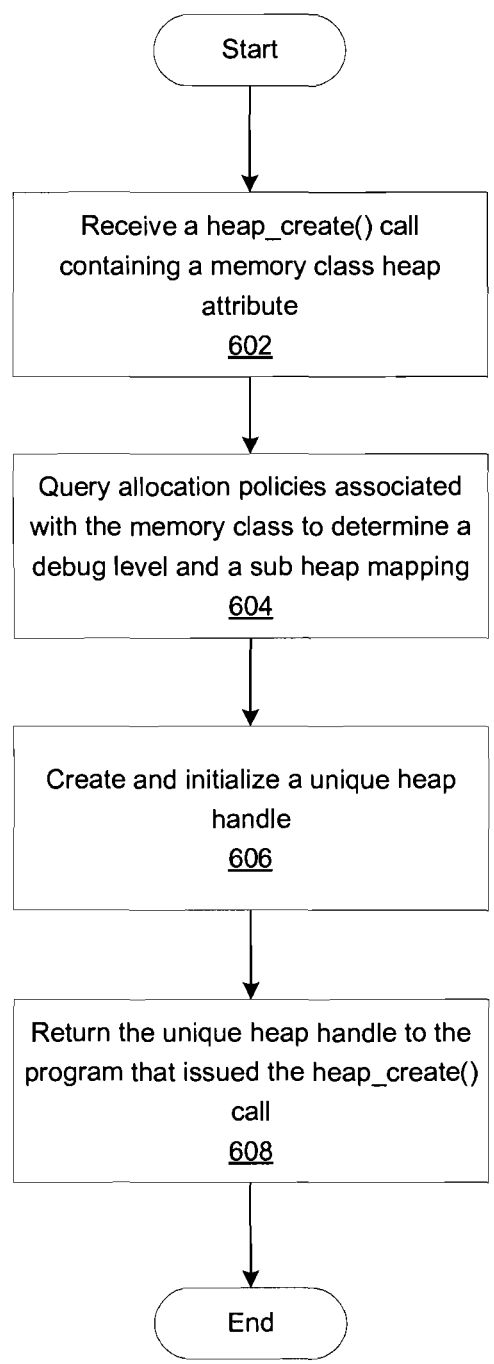
FIG. 6 is a flowchart illustrating a process for providing memory class based heap partitions in accordance with an illustrative embodiment.

FIG. 6 is a flowchart illustrating a process for providing memory class based heap partitions in accordance with an illustrative embodiment. The process of FIG. 6 may be implemented by system 300 in FIG. 3, specifically, by API 314 or API 316. The process begins when an API receives a heap_create( ) call containing a memory class heap attribute (step 602). The API queries allocation policies associated, such as allocation policies 410 in FIG. 4, with the memory class to determine a debug level and a sub heap mapping (step 604). Then the API creates and initializes a unique heap handle (step 606). The API then returns the unique heap handle to the program that issued the heap_create( ) call (step 608) and the process ends. The unique heap handle is used for all subsequent allocation calls. The unique heap handle is used to refer allocation requests to the proper sub heap partition.

Figure 7:
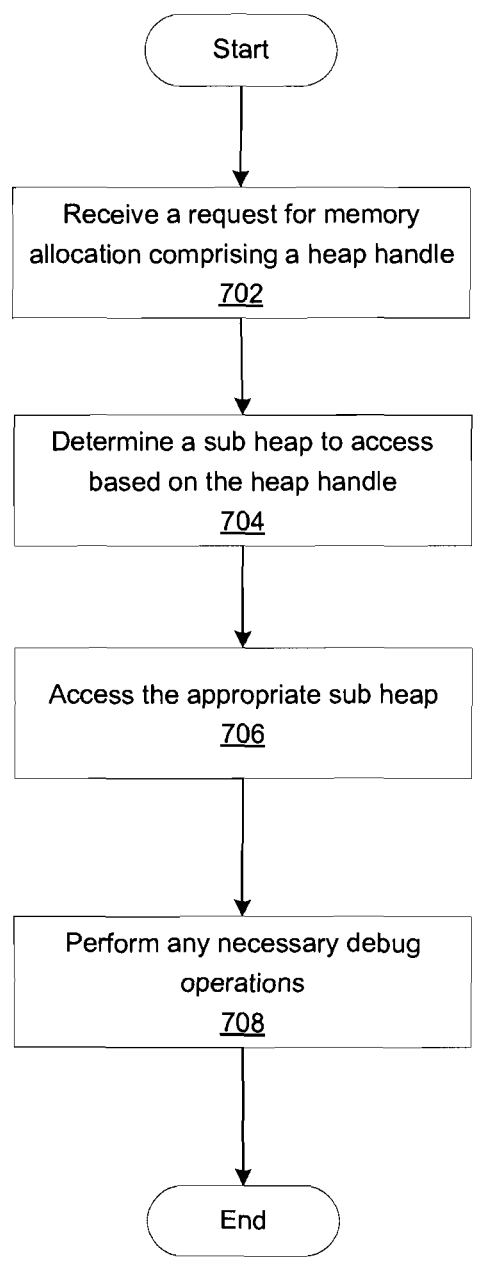
FIG. 7 is a flowchart illustrating a process for accessing multiple memory class based sub heaps in accordance with an illustrative embodiment.

FIG. 7 is a flowchart illustrating a process for accessing multiple memory class based sub heaps in accordance with an illustrative embodiment. The process of FIG. 7 may be implemented by system 300 in FIG. 3, specifically, by API 314 and API 316, and internal function 428 and 430. The process begins when an API receives a request for memory allocation, such as xmalloc( ) call, comprising a heap handle (step 702). The API determines a sub heap partition to access and if any debug operations need to be carried out based on the unique heap handle (step 704). An internal function accesses the appropriate sub heap (step 706). Then any necessary debug operations are performed (step 708) and the process ends.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different illustrative embodiments provide a computer implemented method, apparatus, and computer usable program code for managing a heap. IN different embodiments, the heap is partitioned into at least one sub heap based on a relationship to at least one memory class of a plurality of memory classes. A memory allocation request comprising a memory class is received from a requestor. A unique heap handle based on the memory class and associated with a specific sub heap is generated. The unique heap handle is then returned to the requester.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer performed method for managing a heap, the method comprising:
   within an operating system executing within a computer system, receiving a first call to an application programming interface for generating new sub-heaps, wherein a first sub-heap identifier for uniquely identifying a sub-heap is provided in conjunction with the application programming interface call;
   responsive to receiving the first call to the application programming interface, generating a first sub-heap;
   further responsive to receiving the first call to the application programming interface, generating and returning a first sub-heap handle, wherein the first sub-heap handle is associated with the first sub-heap;
   subsequent to the receiving a first call, receiving a second call to the application programming interface call for generating new sub-heaps, wherein a second sub-heap identifier is provided in conjunction with the second call; and
   responsive to receiving the second call, generating and returning a second sub-heap handle, wherein if the second sub-heap identifier is the same as the first sub-heap identifier, the second sub-heap handle is associated with the first sub-heap, whereby the first sub-heap is shared, and wherein if the second sub-heap identifier is different from the first sub-heap identifier, a second sub-heap is generated and the second sub-heap handle is associated with the second-sub-heap.

2. The method of claim 1, wherein the first and second sub-heap identifiers are text strings, whereby sub-heaps may be given descriptive names.

3. The method of claim 1, wherein the generating the first sub-heap and the generating the second sub-heap generate sub-heaps having particular properties specified by a corresponding allocation policy, wherein the corresponding allocation policy is one of multiple allocation policies for controlling allocation of multiple corresponding sub-heaps.

4. The method of claim 1, further comprising:
   booting the operating system within the computer system; and
   responsive to the booting, retrieving the multiple heap allocation policies from persistent memory, and wherein the generating the first sub-heap and the generating the second sub-heap are performed in conformity with the corresponding one of the retrieved heap allocation policies.

5. The method of claim 4, wherein the heap allocation policies specify debug levels for the corresponding sub-heaps.

6. A computer system comprising a processor for executing program instructions and a memory coupled to the processor for storing the program instructions, wherein the program instructions include program instructions for managing a heap, and wherein the program instructions comprise program instructions for:
   within an operating system executing within a computer system, receiving a first call to an application programming interface for generating new sub-heaps, wherein a first sub-heap identifier for uniquely identifying a sub-heap is provided in conjunction with the application programming interface call;
   responsive to receiving the first call to the application programming interface, generating a first sub-heap;
   further responsive to receiving the first call to the application programming interface, generating and returning a first sub-heap handle, wherein the first sub-heap handle is associated with the first sub-heap;
   subsequent to the receiving a first call, receiving a second call to the application programming interface call for generating new sub-heaps, wherein a second sub-heap identifier is provided in conjunction with the second call; and
   responsive to receiving the second call, generating and returning a second sub-heap handle, wherein if the second sub-heap identifier is the same as the first sub-heap identifier, the second sub-heap handle is associated with the first sub-heap, whereby the first sub-heap is shared, and wherein if the second sub-heap identifier is different from the first sub-heap identifier, a second sub-heap is generated and the second sub-heap handle is associated with the second-sub-heap.

7. The computer system of claim 6, wherein the first and second sub-heap identifiers are text strings, whereby sub-heaps may be given descriptive names.

8. The computer system of claim 6, wherein the program instructions for generating the first sub-heap and generating the second sub-heap generate sub-heaps having particular properties specified by a corresponding allocation policy, wherein the corresponding allocation policy is one of multiple allocation policies for controlling allocation of multiple corresponding sub-heaps.

9. The computer system of claim 6, further comprising program instructions for:
   booting the operating system within the computer system; and
   responsive to the booting, retrieving the multiple heap allocation policies from persistent memory, and wherein the generating the first sub-heap and the generating the second sub-heap are performed in conformity with the corresponding one of the retrieved heap allocation policies.

10. The computer system of claim 9, wherein the heap allocation policies specify debug levels for the corresponding sub-heaps.

11. A computer program product comprising a computer-readable storage device storing program instructions for execution within a computer system, wherein the program instructions include program instructions for managing a heap, wherein the program instructions comprise program instructions for:
   within an operating system executing within a computer system, receiving a first call to an application programming interface for generating new sub-heaps, wherein a first sub-heap identifier for uniquely identifying a sub-heap is provided in conjunction with the application programming interface call;
   responsive to receiving the first call to the application programming interface, generating a first sub-heap;
   further responsive to receiving the first call to the application programming interface, generating and returning a first sub-heap handle, wherein the first sub-heap handle is associated with the first sub-heap;
   subsequent to the receiving a first call, receiving a second call to the application programming interface call for generating new sub-heaps, wherein a second sub-heap identifier is provided in conjunction with the second call; and
   responsive to receiving the second call, generating and returning a second sub-heap handle, wherein if the second sub-heap identifier is the same as the first sub-heap identifier, the second sub-heap handle is associated with the first sub-heap, whereby the first sub-heap is shared, and wherein if the second sub-heap identifier is different from the first sub-heap identifier, a second sub-heap is generated and the second sub-heap handle is associated with the second-sub-heap.

12. The computer program product of claim 11, wherein the first and second sub-heap identifiers are text strings, whereby sub-heaps may be given descriptive names.

13. The computer program product of claim 11, wherein the program instructions for generating the first sub-heap and generating the second sub-heap generate sub-heaps having particular properties specified by a corresponding allocation policy, wherein the corresponding allocation policy is one of multiple allocation policies for controlling allocation of multiple corresponding sub-heaps.

14. The computer program product of claim 11, further comprising program instructions for:
   booting the operating system within the computer system; and
   responsive to the booting, retrieving the multiple heap allocation policies from persistent memory, and wherein the generating the first sub-heap and the generating the second sub-heap are performed in conformity with the corresponding one of the retrieved heap allocation policies.

15. The computer program product of claim 14, wherein the heap allocation policies specify debug levels for the corresponding sub-heaps.

* * * * *